United States Patent [19]

Altounian

[11] Patent Number: 4,975,523

[45] Date of Patent: * Dec. 4, 1990

[54] MANUFACTURE OF BLOCK POLYESTER POLYOLS, AND POLYURETHANES DERIVED THEREFROM

[75] Inventor: Georges N. Altounian, Cap Rouge, Canada

[73] Assignee: Du Pont Neochem, St-Augustin de Desmaures, Canada

[*] Notice: The portion of the term of this patent subsequent to Dec. 6, 2005 has been disclaimed.

[21] Appl. No.: 326,722

[22] Filed: Mar. 21, 1989

[30] Foreign Application Priority Data

Mar. 28, 1988 [GB] United Kingdom ............... 8807344

[51] Int. Cl.$^5$ .................................... C08G 63/02
[52] U.S. Cl. .................................. 528/272; 528/300; 528/307; 521/157
[58] Field of Search .................. 528/272, 300, 307; 521/157

[56] References Cited

U.S. PATENT DOCUMENTS

| | | | |
|---|---|---|---|
| 3,888,908 | 6/1975 | Cross et al. | 560/90 |
| 4,255,541 | 3/1981 | Simms | 525/437 |
| 4,362,825 | 12/1982 | Grabhoefer et al. | 521/172 |
| 4,400,477 | 8/1983 | Blanpied | 521/112 |
| 4,525,574 | 6/1985 | Altounian | 528/283 |
| 4,608,413 | 8/1986 | Nachtkamp | 524/591 |
| 4,716,213 | 12/1987 | Altounian et al. | 528/283 |
| 4,789,719 | 12/1988 | Altounian | 528/283 |

FOREIGN PATENT DOCUMENTS

| | | |
|---|---|---|
| 1059529 | 7/1979 | Canada . |
| 1129598 | 8/1982 | Canada . |
| 61-026612 | 2/1986 | Japan . |
| 882603 | 11/1961 | United Kingdom . |
| 2021602 | 12/1979 | United Kingdom . |

*Primary Examiner*—John Kight, III
*Assistant Examiner*—Sam A. Acquah

[57] ABSTRACT

A method for the manufacture of polyester polyols is disclosed. The method comprises feeding to a reactor at least one aliphatic carboxylic acid or ester thereof, at least one secondary dihydric alcohol and at least one primary trihydric alcohol, heating the resultant admixture and removing water. When at least 95% of the water has been removed, additional primary trihydric alcohol is added and heating is continued. The reactants are selected so that the range of molecular weights thereof is not more than 100. A block polyester polyol is obtained. Polyurethanes obtained from the polyester polyol tend to have more uniform and superior properties. The polyurethanes may be used in variety of end uses.

12 Claims, No Drawings

MANUFACTURE OF BLOCK POLYESTER POLYOLS, AND POLYURETHANES DERIVED THEREFROM

BACKGROUND OF THE INVENTION

1. Field of the Invention

The present invention relates to a method for the manufacture of block polyester polyols, especially polyester polyols in which tetrahydric alcohols are not used in the manufacturing process and ethylene glycol is preferably not used in the manufacturing process, and to polyurethanes obtained from such block polyester polyols. In particular, the invention relates to a method for the manufacture of polyester polyols from aliphatic polycarboxylic acids and polyhydric alcohols in which the acids and alcohols are of similar molecular weight, and especially a method in which the block polyester polyols are formed by reaction of a dicarboxylic acid with a mixture of secondary dihydric alcohols and primary trihydric alcohols, and they by reaction of the resultant product with additional primary trihydric alcohol.

2. Description of the Prior Art

Methods are known for the manufacture of polyester polyols by reacting polycarboxylic acids, or esters or anhydrides thereof, with polyhydric alcohols in the presence of catalysts. Typical reaction times are stated to vary in the range of from 12 to 16 hours at temperatures of 130° to 240° C. A wide variety of carboxylic acids and polyhydric alcohols may be used, as is discussed in U.S. Pat. Nos. 4,525,574 and 4,716,213, both of G. N. Altounian, which issued June 25, 1985 and Dec. 29, 1987, respectively.

The manufacture of polyester polyols from a mixture of 73.1 parts of adipic acid, 54.8 parts of a diol mixture of 21% by weight of 1,4-butanediol, 52% by weight of 1,5-phentanediol and 27% by weight of 1,6-hexanediol, and 2.95 parts of trimethylol propane by esterification at normal pressure and at temperatures of up to 210° C., is disclosed in Example 1 of U.S. Pat. No. 4,362,825 of H. Grabhoefer et al, which issued Dec. 07, 1982. The patent is directed to the manufacture of polyisocyanates from liquid polyester polyols having hydroxyl numbers of 40 to 80 and molecular weights of 1500 to 5000.

Polyesters that have hydroxyl groups and include reaction products of polyhydric, preferably dihydric and optionally trihydric alcohols, with polyvalent, preferably divalent, carboxylic acids are disclosed in U.S. Pat. No. 4,608,413 of K. Nachtkamp et al, which issued Aug. 26, 1986. The polyesters are used in stoving lacquers.

A polyester polyol having an acid number of about 7 and formed from 1248 g of neopentyl glycol, 295 g of trimethylol propane and 2331 g of azelaic acid (1,7-heptanedicarboxylic acid i.e. 1,9-nonanedioic acid ) is disclosed in Example 5 of U.S. Pat. No. 4,255,541 of J. A. Simms, which issued Mar. 10, 1981.

R. H. Blanpied discloses in U.S. Pat. No. 4,400,477, which issued Aug. 23, 1983, that polyester polyols formed from mixtures of aliphatic and aromatic carboxylic acids had superior miscibility with fluorotrichloromethane than did polyester polyols formed from only aliphatic carboxylic acids.

U.S. Pat. No. 3,888,908 of J. M. Cross, which issued June 10, 1975, discloses polyester glycols formed from dicarboxylic acids, dicarboxylic acid anhydrides, dihydric alcohols and trihydric alcohols. The anhydrides are exemplified by phthalic acid anhydride and isophthalic acid anhydride.

Published Japanese patent application No. 61-026612 of Kuraray KK, published Feb. 5, 1986, discloses mixed polyols formed from 3-methyl-1,5-pentanediol, polypropylene glycol and adipic or azelaic acid, and chain extended with ethylene glycol or butanediol.

Canadian Patent No. 1 129 598 of W. Jarre et al, which issued Aug. 10, 1982, discloses polyester polyols manufactured from dicarboxylic acids, preferably aliphatic acids having 2 to 12 carbon atoms, and di- and multifunctional alcohols, preferably ethylene glycol and diethylene glycol. It is also disclosed that alkanolamines e.g. triethanolamine and triisopropanolamine, may be used as multifunctional alcohols.

Polyester polyols derived from butane-1,3-diol, at least one aliphatic polyhydroxy compound containing four hydroxy groups e.g. pentaerythritol, and adipic and/or glutaric acid is disclosed in U.K. patent specification No. 882 603 of Imperial Chemical Industries Limited, published Nov. 15, 1961.

A process for the manufacture of a polyester polyol is described in GB No. 2 021 602A of A. G. Corry, published Dec. 05, 1979. The process comprises reacting an organic polyol with a lower alkyl ester of a polycarboxylic acid and removing lower alkanol from the reaction mixture as it is formed and, towards the end of the reaction, adding an organic polyol or a polycarboxylic acid to the reaction mixture and then continuing the reaction. Other processes for the preparation of polyester polyols are described in Canadian Patent No. 1 059 529 of H. C. Vogt et al, which issued July 31, 1979.

A process for the preparation of block polyester polyols in the presence of N-phenyl dialkanolamines is disclosed in a U.S. Pat. No. 4,789,719 of G. N. Altounian, which issued Dec. 06, 1988.

SUMMARY OF THE INVENTION

It has now been found that block polyester polyols may be formed from carboxylic acids and polyhydric alcohols of substantially the same molecular weight, in the absence of N-phenyl dialkanolamines.

Accordingly, the present invention provides a method for the manufacture of polyester polyols consisting essentially of:

(a) feeding to a reactor (i) at least one aliphatic dicarboxylic acid having 4 to 10 carbon atoms, or esters thereof, (ii) at least one secondary dihydric alcohol having 4 to 8 carbon atoms, and (iii) at least one primary trihydric alcohol having 4 to 14 carbon atoms, the range of molecular weights of said acid, dihydric alcohol and trihydric alcohol being not more than 100;

(b) heating the mixture obtained in (a) in said reactor in the substantial absence of oxygen and removing water formed in the resultant esterification reaction;

(c) when the amount of water removed from the reaction mixture of (b) is at least 95% of the stoichiometric amount for the formation of the polyol, cooling the resultant reaction mixture to a temperature of less than 140° C. and adding additional amounts of at least one primary trihydric alcohol having 4 to 14 carbon atoms such that the total amount of secondary dihydric alcohol and trihydric alcohol is greater than the amount of acid on a molar basis, the range of the molecular weights of said trihydric alcohol and of the acid, dihydric alcohol and trihydric alcohol of (a) being not more than 100; and (d) further heating the reaction mixture and removing water to obtain a polyester polyol, said polyol having a hydroxyl number of less than 650, an acid value of less than 3.5 and a hydroxyl functionality of at least 2.0.

The present invention also provides a method for the manufacture of polyester polyols consisting essentially of:

(a) feeding to a reactor (i) at least one aliphatic dicarboxylic acid having 4 to 10 carbon atoms, or esters thereof, (ii) up to one mole, per mole of acid, of at least one secondary dihydric alcohol having 4 to 8 carbon atoms, and (iii) 0.05 to 0.65 moles, per mole of acid, of at least one primary trihydric alcohol having 4 to 14 carbon atoms, the range of the molecular weights of said acid, dihydric alcohol and trihydric alcohol being not more than 100;

(b) heating the mixture obtained in (a) in said reactor in the substantial absence of oxygen and removing water formed in the resultant esterification reaction;

(c) when the amount of water removed from the reaction mixture of (b) is at least 95% of the stoichiometric amount for the formation of the polyol, cooling the resultant reaction mixture to a temperature of less than 140° C. and adding 0.10 to 0.70 moles, per mole of acid, of at least one primary trihydric alcohol having 4 to 14 carbon atoms such that the total amount of secondary dihydric alcohol and trihydric alcohol is greater than the amount of acid on a molar basis, the range of the molecular weights of said trihydric alcohol and of said acid, dihydric alcohol and trihydric alcohol of (a) being not more than 100; and (d) further heating the reaction mixture and removing water to obtain a polyester polyol, said polyol having a hydroxyl number of less than 650, an acid value of less than 3.5 and a hydroxyl functionality of at least 2.0.

In preferred embodiments of the methods of the present invention, a primary dihydric alcohol is also added in step (a) and/or in step (c), especially such an alcohol having a molecular weight in the range specified therein.

In further embodiments, the secondary dihydric alcohol is dipropylene glycol, the trihydric alcohol is trimethylol propane in both instances and the acid is adipic acid, and the primary dihydric alcohol if present is cyclohexane dimethanol.

In other embodiments, the resultant polyol is characterized by having substantially the same reactivity to diphenylmethane-4,4'-diisocyanate at each end of the polyol molecule.

DETAILED DESCRIPTION OF THE INVENTION

The present invention is directed to the manufacture of polyols by the reaction of aliphatic carboxylic acids and polyhydric alcohols in the absence of alkanolamines. In the process, at least one aliphatic acid, at least one secondary dihydric alcohol and at least one primary trihydric alcohol are fed to a reactor, heated with the water that is the by-product of the resultant esterification reaction being removed, and then additional primary trihydric alcohol is added. It is preferred that a primary dihydric alcohol also be fed to the reactor, especially with the feeding of the additional primary trihydric alcohol to the reactor.

Tetrahydric alcohols are not fed to the reactor, because the resultant polyester polyol tends to have bulky or sterically hindered hydroxyl end groups and thus reduced reactivity in the formation of polyurethanes. Such polyurethanes would normally require a post-curing step in order to obtain acceptable properties. Low molecular weight primary dihydric alcohols are preferably not fed to the reactor, as is discussed herein.

The aliphatic carboxylic acid has 4 to 10 carbon atoms. Examples of such acids are succinic acid (1,4-butanedioic acid), glutaric acid (1,5-pentanedioic acid), adipic acid (1,6-hexanedioic acid), pimelic acid (1,7-heptanedioic acid), suberic acid (1,8-octanedioic acid), azelaic acid (1,9-nonanedioic acid) and sebacic acid (1,10-decanedioic acid). Mixtures of such acids may be used. The preferred acid is adipic acid. The acids may be in the form of the ester e.g. lower alkyl esters and especially methyl or ethyl esters.

The dihydric alcohol fed to the reactor has 4 to 10 carbon atoms, examples of which are diethylene glycol, dipropylene glycol, cyclohexane dimethanol, 1,4-butanediol, triethylene glycol, polytetramethylene ether glycol, 1,6-hexanediol, neopentyl glycol and dibromo neopentyl glycol. The dihydric alcohol fed to the reactor may be a mixture of such alcohols. The preferred secondary dihydric alcohol is dipropylene glycol and the preferred primary dihydric alcohol, if present, is cyclohexane dimethanol. The primary trihydric alcohol has 4 to 14 carbon atoms, the preferred example of which is trimethylol propane.

The aliphatic carboxylic acid, secondary dihydric alcohol and primary trihydric alcohol are selected so that the molecular weights of those compounds as fed to the reactor have a range of not more than 100. The preferred range of molecular weights is not more than 50.

The use of compounds having a narrow range of molecular weights in the method of the present invention has at least two advantages. For instance, the absence of compounds of substantially lower molecular weight, especially glycols, reduces the potential loss of such compounds from the reactor e.g. with the removal of water produced in the esterification reaction, and a consequent need to either add additional amounts of the low molecular weight compounds during the reaction or a need to add extra amounts at the start of the reaction to compensate for the loss during the reaction. In addition, there is a reduced tendency for transesterification reactions to occur, which tend to increase the reaction time required to achieve a predetermined amount of reaction. The polyester polyols of the invention tend to have a uniform molecular weight distribution and to form polyurethanes of more uniform properties. As is illustrated hereinafter, polyester polyols having hydroxyl numbers close to the theoretical values are readily obtainable, and are obtainable in a reproducible manner.

The acid, dihydric alcohol and trihydric alcohol are fed to a reactor and heated in the substantial absence of oxygen. Catalysts for esterification reactions are usually also added, examples of which are stannous and stannic chloride and alkyl tin compounds. As the esterification reaction to form the polyester polyol occurs, the by-product water is formed. In order to facilitate the reaction, it is important to remove the water from the reactor, thereby driving the reaction towards completion. Several methods may be used to remove water. For instance, a vacuum may be applied to the reactor or an inert gas e.g. nitrogen, may be fed to the reactor so that water is removed from the reactor as it is liberated in the reactor. Alternatively, an inert low boiling material may be added on a continuous or intermittent basis, especially such a material that forms an azeotrope with water; formation of an azetrope would permit separation of water from the material outside of the reactor and reintroduction i.e. recycling, of the material into the reactor.

The amount of water removed from the reactor is monitored, as it is a measure of the extent of reaction inside the reactor. When the amount of water removed has reached at least 95% of the stoichiometric amount for the esterification reaction forming the polyester polyol, and especially at least 97% of the stoichiometric amount, then the additional trihydric alcohol is added to the reactor. The reaction is then continued until the desired degree of reaction has occurred.

Using the process of the present invention, reaction times for the manufacture of the polyol may be in the range of 5 to 10 hours, especially approximately 6-7 hours, depending in part on the rate of heating of the reactor.

The amounts of acid, and di- and trihydric alcohols fed to the reactor may be varied. However, the amount of acid, expressed as equivalents of acid, will be approximately equal to or less than the combined amount of di- and trihydric alcohols, expressed as equivalents of hydroxyl groups. In embodiments, the amount of secondary dihydric alcohol added may up to the amount of acid, on a molar basis, especially in the range of 0.4 to 0.85 moles and preferably 0.45 to 0.60 moles, per mole of acid. Similarly, the primary trihydric alcohol added in step (a) of the reaction is preferably in the range of 0.5 to 0.65 moles and especially 0.3 to 0.5 moles, per mole of acid, and the amount of primary trihydric alcohol added in step (c) is preferably 0.10 to 0.70 moles and especially 0.5 to 0.65 moles, per mole of acid. The amount of primary dihydric alcohol added in step (a) may be from 0 to one mole, per mole of acid, and if used is preferably in the range of 0.2 to 0.4 moles per mole of acid. The amount of primary dihydric alcohol added in step (c) may be from 0 mole to 0.35 moles, and especially 0.15 to 0.25 moles, per mole of acid.

The total amount of alcohols is preferably at least 1.2 moles per mole of acid and more especially 1.8 to 2.2 moles per mole of acid. It will be appreciated that the ratio of the total amount of alcohols to acid will have significant affects on the properties of polyurethanes formed from the polyester polyol.

As noted above, N-phenyl dialkanolamine is not added to the process of the present invention.

The polyester polyols of the invention are liquids at ambient temperatures, which facilitates handling of the polyester polyols in subsequent end uses. In addition the polyester polyols, and hence products made therefrom, tend to have good hydrolitic stability. The block nature of the polyester polyol separates so-called hard segments from so-called soft segments, and tends to result in improvements in tensile strength, flexural strength and impact strength of products derived from the polyester polyols of the invention. The reactive groups of the polyester polyol are at the ends of the molecule, usually a hydroxyl group at one end and two hydroxyl groups at the other end. Thus, reactions e.g. the formation of polyurethanes and especially cross-linking reactions in the formation of polyurethanes, occur at the ends of the molecule, thereby tending to increase tensile strength, elongation and impact strength of resultant products. The relatively symmetrical nature of the polyester polyol facilitates hydrogen bonding and improves heat distortion temperatures of polyurethanes.

The use of secondary alcohols tends to decrease the rate of reaction of alcohol groups with isocyanate groups, which facilitates control of the formation of the polyurethane e.g. gel times may readily be controlled in the range of a few seconds to several minutes. The result is that unitary large polyurethane parts weighing up to 100 or more kilograms may be manufactured. In addition, the polyester polyols are compatible with gaseous fluorocarbon blowing agents, which may therefore be introduced into polyurethane reactions in the polyol e.g. polyester polyol containing blowing agent may be manufactured and shipped as a commercial entity to a manufacturer of polyurethanes, whereas polyester polyols usually are incompatible with such blowing agents.

As noted above, the polyester polyols obtained by the method of the present invention may be used in the manufacture of polyurethanes, including foamed polyurethanes. Examples of the blowing agents include fluorotrichloromethane, dichlorodifluoromethane, chlorodifluoromethane, trichlorotrifluoroethane and the like, including the fluorocarbon blowing agents that are being developed as replacements for chlorofluorocarbon blowing agents. As also noted above, such fluorocarbons may dissolve in the polyester polyol of the invention, which may eliminate any need for separate addition of blowing agent to the polyurethane as is standard practice in the industry.

Polyurethanes may be formed using aliphatic or aromatic isocyanates, or polyisocyanurate. Examples of aliphatic isocyanates include isophorone diisocyanate, hexamethylene diisocyanate and adducts of hexamethylene diisocyanate. Examples of aromatic diisocyanates include phenylene-1,3- and 1,4,-diisocyanate, diphenylmethane-4,4'-diisocyanate, triphenyl-4,4',4"-triisocyanate and polyphenylpolymethylenepolyisocyanate. The polyester polyol and isocyanate are used in ratios of 0.5 to 4:1 by weight.

In the manufacture of polyurethanes, especially rigid polyurethanes, cross-linking agents and extenders are added to the reaction mixture used to form the polyurethane. Examples of such cross-linking agents are tetrahydric alcohols, sorbitols and trihydric alcohols. Examples of extenders include 1,4-butanediol, ethylene glycol and primary diamines. However, in the manufacture of polyurethanes using the polyols of the present invention, it is often not necessary to add cross-linking agents because of the particular structure of the polyester polyol and the resultant properties of polyurethanes derived therefrom.

Polyurethanes are manufactured from an isocyanate and a polyol. A typical isocyanate is diphenyl methane 4,4'-diisocyanate. It is known to react that isocyanate with an aromatic unsaturated polyester polyol that contains a vinylic monomer e.g. styrene, methyl methacrylate, and to use the unsaturation in subsequent cross-linking of the polyurethane. Such polyurethanes containing 40% by weight of long strand continuous non-knitted glass fibre e.g. Owens Corning OCF 8608X4 glass fibre, may have a flexural modulus of about 1 200 00 psi and exhibit shrinking when moulded, which adversely affects the finish attainable on the moulded article. Alternatively, the polyol may be a polyether polyol and cross-linking may be achieved by the use of a trifunctional isocyanate. At a 60% loading of long strand continuous non-knitted glass fibre, a flexural modulus of 1 800 000 psi is attainable, compared with a flexural modulus of about 350 000 psi when unfilled.

Both of the above types of polyurethanes tend to be brittle at low temperatures.

Polyurethanes formed from the polyester polyols of the present invention using the above isocyanate have a flexural modulus of 150 000 to 200 000 psi when unfilled with glass fibre, but when filled at a 60% level with long strand continuous non-knitted glass fibre, the flexural modulus may be up to 2 250 000 psi. Thus, the polyester polyol of the invention appears to exhibit good wet out of the glass fibre. In addition, the filled polyurethanes exhibit relatively low shrinkage and produce moulded articles with excellent finish.

The polyester polyols manufactured by the method of the present invention may be used, in particular, in the manufacture of polyurethanes. The polyurethanes may be intended for use in a variety of end uses e.g. as foams or as structural parts.

As used herein, "acid value" is the number of milligrams of potassium hydroxide required to neutralize one gram of a sample of the polyester polyol. "Hydroxyl number" is a measure of the equivalent weight of the polyester polyol. "Functionality" is a measure of the number of free hydroxyl groups in the polyester polyol.

The present invention is illustrated by the following examples.

Preparation of Polyester Polyols:

EXAMPLE I

The polyester polyols were prepared in a reactor comprising a 12 liter flask equipped with a mechanical stirrer and three inlets. The latter were used to feed an inert gas viz. nitrogen, and reactants to the reactor. The reactor was also equipped with a condenser to recover water passing from the reactor and means to heat the reactor.

The following were introduced into the reactor: 3853 g of adipic acid, 2937 g of dipropylene glycol, 1415 g of trimethylol propane, 5 g of dibutyl tin oxide and 2 g of ethyl-hexyl titanate. The resultant mixture was heated under an inert atmosphere (nitrogen) and stirred. When the temperature of the reaction mixture reached about 156° C., water started to distill from the reactor; heating was continued until the temperature reached 180° C. When about 97% of the water has been distilled off, i.e. 566.6 g, the reactor was cooled to 130° C., while maintaining the reaction mixture under insert atmosphere. 759 g of cyclohexane dimethanol and 2052 g of trimethylol propane were than added to the reactor, which was then re-heated. When the temperature had reached about 160° C., and the theoretical amount of water had been removed, the acid value of the polyester polyol was monitored about every thirty minutes, until the acid value had reached 0.5. The hydroxyl number was then measured. When the polyester polyol had reached both the desired acid value and hydroxyl number, the reactor was cooled down to 130° C. and the resultant polyester polyol was removed from the reactor.

The polyester polyol thus obtained had a functionality of 3.0, a hydroxyl number of 455 (2.4% higher than the theoretical number) and an acid value of 0.4. The Brookfield viscosity at 25° C. was 5430 centipoise (cps) and at 60° C., was 368 cps. The reaction time was 7.0 hours. The amount of dihydric alcohol lost in the distillate during the reaction was 1.65% of the dihydric alcohol.

Preparation of Composite Structures

EXAMPLE II

A polyurethane was prepared from the polyester polyol of Example I and hexamethylene diisocyanate adduct (a trimer of hexamethylene diisocyanate obtained from Rhone Poulenc under the trade name TOLONATE HDT)

|  | % by weight |
| --- | --- |
| Component B |  |
| polyester polyol | 87.904 |
| anti-foaming agent (BYK-500) | 0.071 |
| titanium dioxide | 12.000 |
| dibutyl tin dilaurate | 0.010 |
| phosphorus oxytrichloride | 0.015 |
|  | 100.00 |
| Component A |  |
| hexamethylene diisocyanate adduct | 125 parts/100 parts of Component B. |

The polyurethane obtained had a gel time of 4 minutes when the Component B was at 60° C. and Component A was at 46° C. The Shore D (Gardner) hardness was 78.

EXAMPLE III

A polyurethane was prepared from the polyester polyol of Example I and hexamethylene diisocyanate adduct (a trimer of hexamethylene diisocyanate obtained from Rhone Poulenc under the trade name TOLONATE HDT)

|  | % by weight |
| --- | --- |
| Component B |  |
| polyester polyol | 87.919 |
| anti-foaming agent (BYK-500) | 0.071 |
| titianium dioxide | 12.000 |
| dibutyl tin dilaurate | 0.010 |
|  | 100.00 |
| Component A |  |
| hexamethylene diisocyanate adduct | 125 parts/100 parts of Component B. |

The polyurethane obtained had a gel time of 2.25 minutes when the Component B was at 60° C. and Component A was at 46° C. The Shore D (Gardner) hardness was 75-78.

The polyurethane was tested in a Weather-O-Meter using a xenon lamp. After continuous exposure to irradiation for a period of 1000 hours, the samples showed no evidence of attack by ultra violet light (ASTM procedure G-26) and no change in colour (ASTM procedure E-805).

What is claimed is:

1. A method for the manufacture of polyester polyols consisting essentially of:
    (a) feeding to a reactor (i) at least one aliphatic dicarboxylic acid having 4 to 10 carbon atoms, or ester thereof, (ii) at least one secondary dihydric alcohol having 4 to 8 carbon atoms, and (iii) at least one primary trihydric alcohol having 4 to 14 carbon atoms,
        the range of molecular weights of said acid, dihydric alcohol and trihydric alcohol being not more than 100;

(b) heating the mixture obtained in (a) in said reactor in the substantial absence of oxygen and removing water formed in the resultant esterification reaction;

(c) when the amount of water removed from the reaction mixture of (b) is at least 95% of the stoichiometric amount for the formation of the polyol, cooling the resultant reaction mixture to a temperature of less than 140° C., and adding additional amounts of at least one primary trihydric alcohol having 4 to 14 carbon atoms such that the total amount of secondary dihydric alcohol and trihydric alcohol is greater than the amount of acid on a molar basis, the range of the molecular weights of said trihydric alcohol and of the acid, dihydric alcohol and trihydric alcohol of (a) being not more than 100; and (d) further heating the reaction mixture and removing water to obtain a polyester polyol, said polyol having a hydroxyl number of less than 650, an acid value of less than 3.5 and a hydroxyl functionality of at least 2.0.

2. The method of claim 1 in which the range of molecular weights is not more than 50.

3. The method of claim 1 in which the secondary dihydric alcohol is dipropylene glycol, the trihydric alcohol is trimethylol propane in both instances and the acid is adipic acid.

4. The method of claim 1 in which the resultant polyol is characterized by having substantially the same reactivity to diphenylmethane4,4'-diisocyanate at each end of the polyol molecule.

5. The method of claim 1 in which a primary dihydric alcohol is added in step (c).

6. The method of claim 1 in which a primary dihydric alcohol is added in step (a).

7. The method of claim 5 in which the primary dihydric alcohol has a molecular weight in the range specified in step (a).

8. The method of claim 6 in which the primary dihydric alcohol has a molecular weight in the range specified in step (a).

9. The method of claim 5 in which the secondary dihydric alcohol is dipropylene glycol, the trihydric alcohol is trimethylol propane in both instances, the acid is adipic acid and the primary dihydric alcohol is cyclohexane dimethanol.

10. The method of claim 6 in which the secondary dihydric alcohol is dipropylene glycol, the trihydric alcohol is trimethylol propane in both instances, the acid is adipic acid and the primary dihydric alcohol is cyclohexane dimethanol.

11. A method for the manufacture of polyester polyols consisting essentially of:

(a) feeding to a reactor (i) at least one aliphatic dicarboxylic acid having 4 to 10 carbon atoms, or ester thereof, (ii) up to one mole, per mole of acid, of at least one secondary dihydric alcohol having 4 to 8 carbon atoms, and (iii) 0.05 to 0.65 moles, per mole of acid, of at least one primary trihydric alcohol having 4 to 14 carbon atoms, the range of the molecular weights of said acid, dihydric alcohol and trihydric alcohol being not more than 100;

(b) heating the mixture obtained in (a) in said reactor in the substantial absence of oxygen and removing water formed in the resultant esterification reaction;

(c) when the amount of water removed from the reaction mixture of (b) is at least 95% of the stoichiometric amount for the formation of the polyol, cooling the resultant reaction mixture to a temperature of less than 140° C. and adding 0.10 to 0.70 moles, per mole of acid, of at least one primary trihydric alcohol having 4 to 14 carbon atoms such that the total amount of secondary dihydric alcohol and trihydric alcohol is greater than the amount of acid on a molar basis, the range of the molecular weights of said trihydric alcohol and of said acid, dihydric alcohol and trihydric alcohol of (a) being not more than 100; and (d) further heating the reaction mixture and removing water to obtain a polyester polyol, said polyol having a hydroxyl number of less than 650, an acid value of less than 3.5 and a hydroxyl functionality of at least 2.0.

12. The method of claim 11 in which the range of molecular weights is not more than 50.

* * * * *